(12) United States Patent
Kim et al.

(10) Patent No.: US 6,956,634 B2
(45) Date of Patent: Oct. 18, 2005

(54) THIN FILM TRANSISTOR LIQUID CRYSTAL DISPLAY

(75) Inventors: Sung Woon Kim, Kyoungki-do (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 164 days.

(21) Appl. No.: 10/146,540

(22) Filed: May 15, 2002

(65) Prior Publication Data

US 2002/0171790 A1 Nov. 21, 2002

(30) Foreign Application Priority Data

May 17, 2001 (KR) ........................................ 2001-26914

(51) Int. Cl.⁷ ............................................ G02F 1/1345
(52) U.S. Cl. ........................................ 349/141; 349/44
(58) Field of Search ........................... 349/110, 44, 142, 349/139

(56) References Cited

U.S. PATENT DOCUMENTS

| | | | | |
|---|---|---|---|---|
| 5,907,379 A | * | 5/1999 | Kim et al. | 349/141 |
| 6,133,977 A | * | 10/2000 | Lee et al. | 349/141 |
| 6,449,027 B2 | * | 9/2002 | Lee et al. | 349/141 |
| 6,459,465 B1 | * | 10/2002 | Lee | 349/141 |
| 6,466,289 B1 | * | 10/2002 | Lee et al. | 349/141 |
| 6,563,561 B1 | * | 5/2003 | Tsumura et al. | 349/141 |

* cited by examiner

*Primary Examiner*—Toan Ton
(74) *Attorney, Agent, or Firm*—Ladas & Parry LLP

(57) ABSTRACT

A thin film transistor liquid crystal display is capable of improving a screen quality by preventing generation of residual ions in pixels. The disclosed comprises a substrate; a plurality of gate bus lines arranged to a predetermined direction on the substrate, having a gate pad unit for applying driving signals; a plurality of data bus lines cross-arranged with the gate bus lines to define a unit pixel, having a data pad unit for applying graphic signals; a thin film transistor arranged at the intersection of the data bus lines and gate bus lines; a pixel electrode arranged in the unit pixel region to be in contact with the thin film transistor; and a plurality of common bus lines arranged parallel with the gate bus lines, having a common pad unit for regularly applying common signals to pixels; and wherein a shielding line is arranged to be in contact with the common bus line and parallel with the data bus line on the outer side of pixels adjacent to the common pad unit and gate pad unit.

8 Claims, 6 Drawing Sheets

THIN FILM TRANSISTOR LIQUID CRYSTAL DISPLAY

BACKGROUND OF THE INVENTION

1. Field of the Invention

The present invention relates to a liquid crystal display and, more particularly, to a thin film transistor liquid crystal display capable of preventing bright line generation due to adsorption of residual ions in pixels adjacent to a gate pad unit.

2. Description of the Prior Arts

As is generally known, a liquid crystal display has a structure that a plurality of gate bus lines and data bus lines are cross-arranged to define unit pixels and thin film transistors are arranged at the intersection thereof.

A pixel electrode is arranged on each pixel to be in contact with a drain electrode of the thin film transistor. The plurality of data bus lines are in contact with a source electrode of the thin film transistor for applying graphic signals.

A common bus line, which regularly applies predetermined common signals, is arranged to form storage capacitor, being in contact with a predetermined part of the pixel electrode.

According to the liquid crystal display, when driving signals are applied to a plurality of gate pad units, they are transmitted along a gate bus line. Then, when the thin film transistor is turned on, graphic signals, applied along the data bus line, are applied to the pixel electrode through a channel layer of the thin film transistor, thereby realizing a desired graphic.

As described above, a storage common structure is divided into a pi ($\pi$) structure and a linear structure. In the pi structure, a common bus line applying common signals has branches overlapped with a predetermined part of pixel electrode and both sides thereof. And, in the linear structure, the common bus line is arranged on lower part of the pixel electrode to be parallel with the gate bus line.

FIG. 1 is a drawing showing a thin film transistor liquid crystal display having a common bus line of a pi ($\pi$) structure according to a conventional art. As shown in the drawing, a plurality of gate bus lines 1 and a plurality of data bus lines 5 are cross-arranged to define a unit pixel, and thin film transistors 7 are arranged at the intersection thereof, as a switching device.

A common bus line 3, in contact with a common pad unit 20, has a branch overlapped with a predetermined part of a pixel electrode (not illustrated) on the upper part and both sides thereof. The common bus line 3 applies predetermined common signals with a regular cycle.

In the drawing, a reference code 10 is a gate pad unit and a reference code 6 is residual ion.

FIG. 2 is a drawing showing a thin film transistor liquid crystal display having a common bus line of linear type according to a conventional art. As shown in the drawing, it has the same structure to FIG. 1 except that the common bus line 13 is arranged on the center of pixel region, parallel with the gate bus line 11.

In the liquid crystal display having the structure, driving signals are applied to the gate pad unit 10 and then, sequentially applied to each pixel through the gate bus line 11 in contact with the gate pad unit 10, wherein common signals are regularly inputted in the common pad unit 40 and then, applied to each pixel through the common bus line 13. A reference code 19 is a pixel electrode.

However, the above-identified liquid crystal display has a disadvantage that the pixels adjacent to the gate pad unit have data bus lines not symmetrically on both sides thereof, thereby generating adsorption of residual ions 6 due to the asymmetrical structure and voltage difference of gate signal and common signal in signal application. The adsorbed residual ions form an electric field and cause light leakage on the outmost pixels in display. As a result, the screen quality is deteriorated.

Referring to FIG. 1, in the pi ($\pi$) shape common bus line, branches are formed along a pixel opening to be overlapped with the upper part of pixel electrode and in contact with both sides thereof, thereby shielding diffusion of residual ions to some extent. However, on the lower part, adsorption of residual ions 6 is generated since it is difficult to shield diffusion by the gap between branch and gate bus line 1.

Referring to FIG. 2, when the common bus line is formed in a linear shape, adsorption of residual ions 16 is generated on both upper and lower parts of pixel regions since there is no common bus line 13 operating as a shield thereon.

SUMMARY OF THE INVENTION

Therefore, the present invention has been made to solve the above problems and an object of the present invention is to provide a thin film transistor liquid crystal display capable of preventing generation of bright lines due to adsorption of residual ions in pixels adjacent to gate pad unit.

In order to accomplish the above object, the present invention comprises: a substrate, a plurality of gate bus lines arranged to a predetermined direction on the substrate, having a gate pad unit for applying driving signals; a plurality of data bus lines cross-arranged with the gate bus lines to define a unit pixel, having a data pad unit for applying graphic signals; a thin film transistor arranged at the intersection of the gate bus lines and the data bus lines; a pixel electrode arranged on the unit pixel region, being in contact with the thin film transistor; and a plurality of common bus lines arranged parallel with the gate bus lines, having a common pad unit for regularly applying common signal to the pixel, wherein a shielding line is arranged to be in contact with the common bus line and parallel with the data bus line on the outer region of pixels adjacent to the common pad unit and gate pad unit.

The common bus line has a pi ($\pi$) structure wherein it is overlapped with upper part and both sides of the pixel electrode or a linear structure wherein it is overlapped with the center part of pixel electrode.

According to another embodiment, the present invention comprises: a substrate; a plurality of gate bus lines arranged to a predetermined direction on the substrate, having a gate pad unit for applying driving signal; a plurality of data bus lines cross-arranged with the gate bus lines to define a unit pixel, having a data pad unit for applying graphic signals; a thin film transistor arranged at the intersection of the gate bus lines and the data bus lines; a pixel electrode arranged in the unit pixel region, being in contact with the thin film transistor; and a plurality of common bus lines arranged parallel with the gate bus lines, having a common pad unit for regularly applying common signals to pixels, wherein two or more shielding branches in the pixel region are arranged to be in contact with the common bus line on the outer side of pixels adjacent to the common pad unit and the gate pad unit.

The common bus line has a pi ($\pi$) structure wherein it is overlapped with upper part and both sides of the pixel electrode or a linear structure wherein it is overlapped with the center part of pixel electrode, and three shielding branches are formed on each pixel region at the same time with formation of the common bus line.

The present invention has an advantage that it can prevent generation of bright lines due to adsorption of residual ions in pixels adjacent to signal application unit by arranging shielding lines or shielding branches to be in contact with the common bus line and parallel with the data bus line between the gate pad unit for signal application and pixels adjacent to common pad unit.

BRIEF DESCRIPTION OF THE INVENTION

DETAILED DESCRIPTION OF THE INVENTION

The objects and features of the invention may be understood with reference to the following detailed description of an illustrative embodiment of the invention, taken together with the accompanying drawings.

Figure 1:
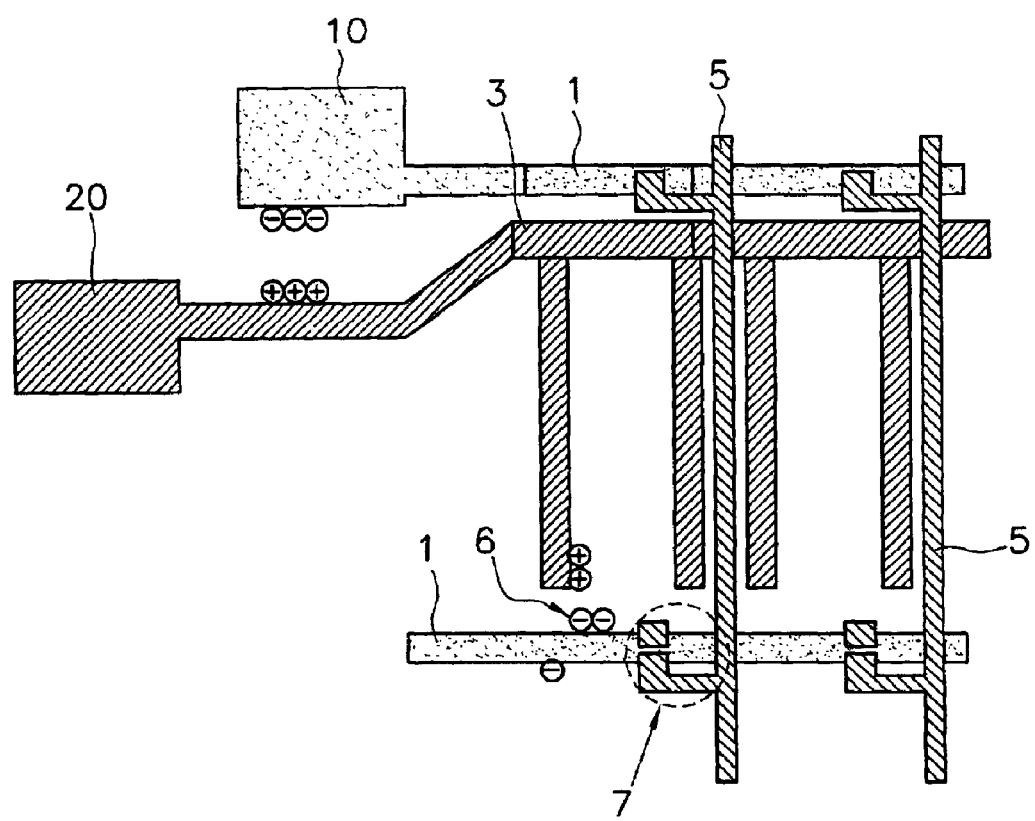
FIG. 1 is a drawing showing a thin film transistor liquid crystal display having a pi ($\pi$) shape common bus line according to a conventional art.
Figure 2:
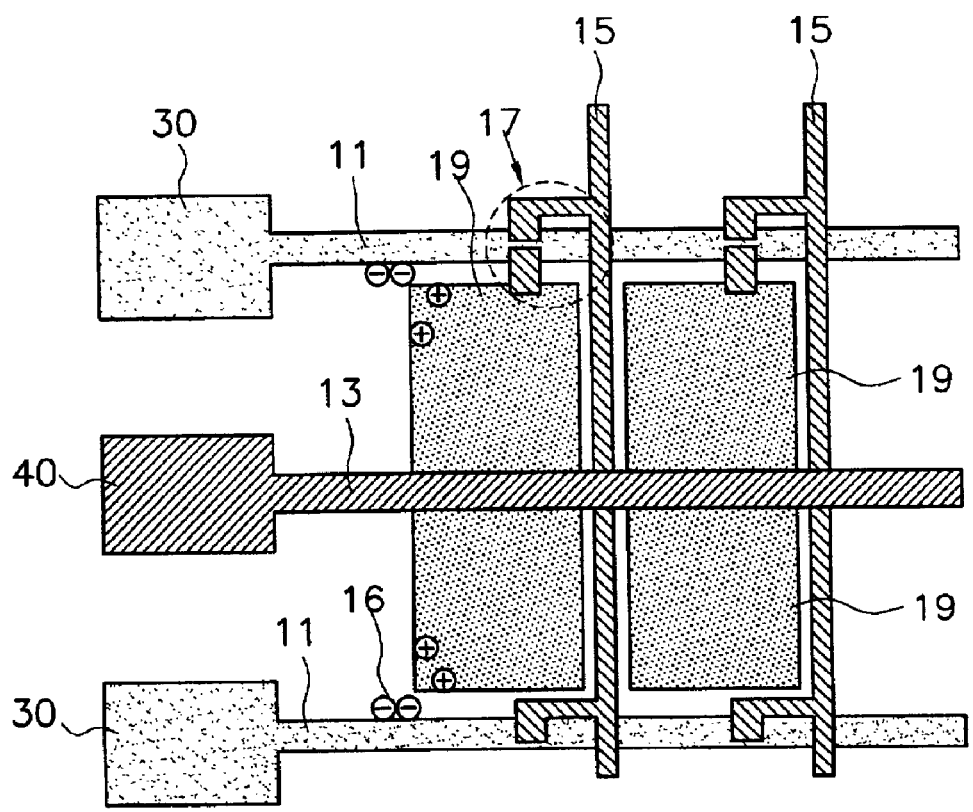
FIG. 2 is a drawing showing a thin film transistor liquid crystal display having a linear shape common bus line according to a conventional art.
Figure 3:
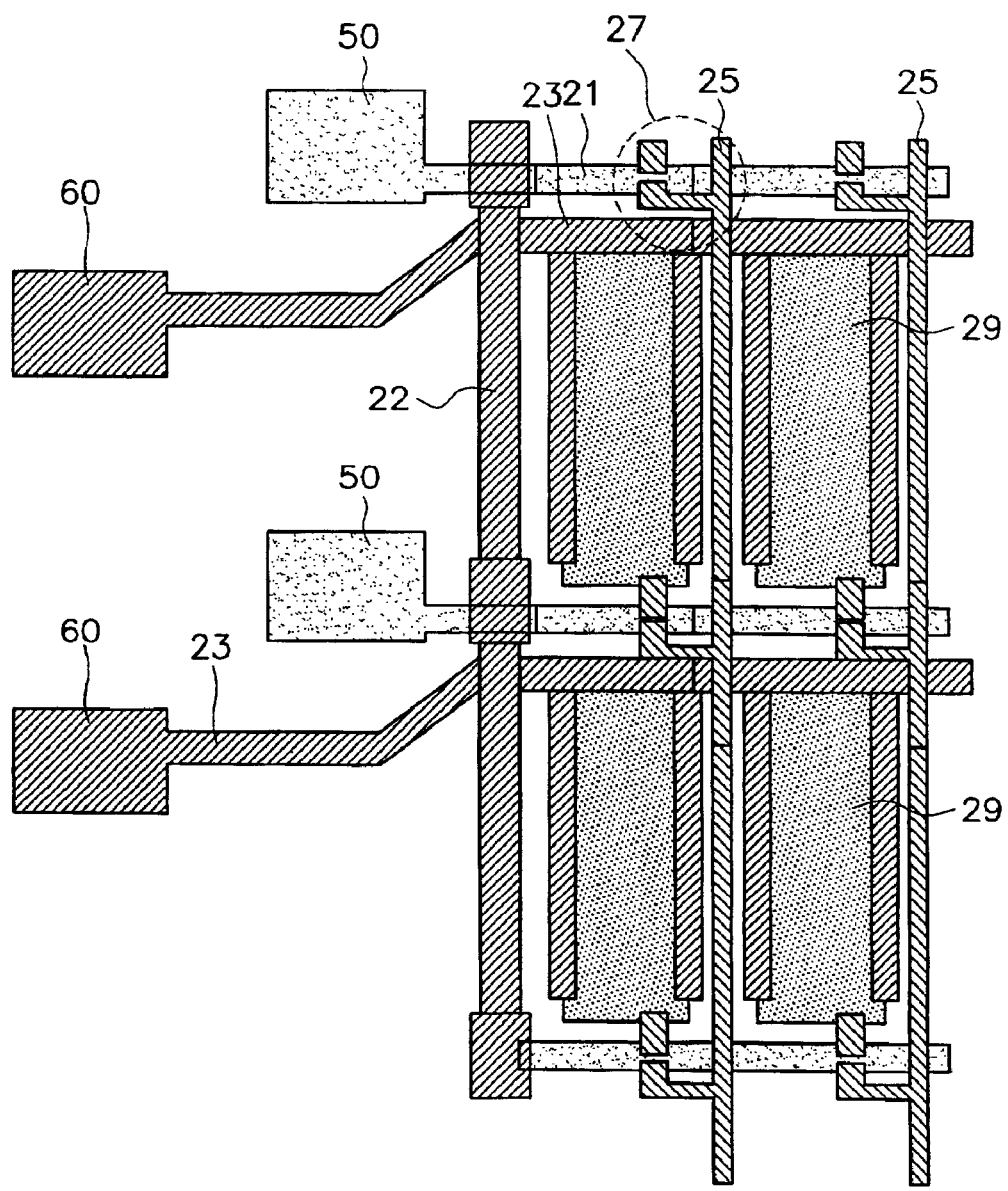
FIG. 3 is a drawing showing a thin film transistor liquid crystal display having a pi ($\pi$) shape common bus line according to the present invention.

FIG. 3 is a drawing showing a thin film transistor liquid crystal display having a pi ($\pi$) shape common bus line according to the present invention. As shown in the drawing, gate pad units 50 are arranged to be in contact with a plurality of gate bus lines 21 and common pad units 60 are arranged to be in contact with a plurality of common bus lines 23.

And, a plurality of data bus lines 25 are cross-arranged with the gate bus lines 21 to define a unit pixel and thin film transistors 27 are arranged at the intersection thereof as switching devices.

The common bus lines 23 are arranged to be overlapped with the upper part of pixel electrode, having branches in contact with a predetermined part of pixel electrode. Moreover, a shielding line 22 is arranged parallel with the data line to prevent adsorption of residual ions on the outmost pixel unit adjacent to the gate pad unit and the data pad unit due to voltage difference between gate signal and common signal.

The shielding line 22 is obtained by forming a contact hole on the region to be electrically in contact with the common bus line 23 and then, depositing and patterning a metal for shielding line. The shielding line 22 is arranged to be parallel with the data bus line 25 and in contact with the common bus line 23 on each pixel region.

According to the present invention, the shielding line 22 is arranged on the outer side of pixels adjacent to pad unit to be in contact with the common bus line 23 and apply the same voltage with the common bus line, thereby preventing adsorption of residual ions on the lower parts of pixel.

Figure 4:
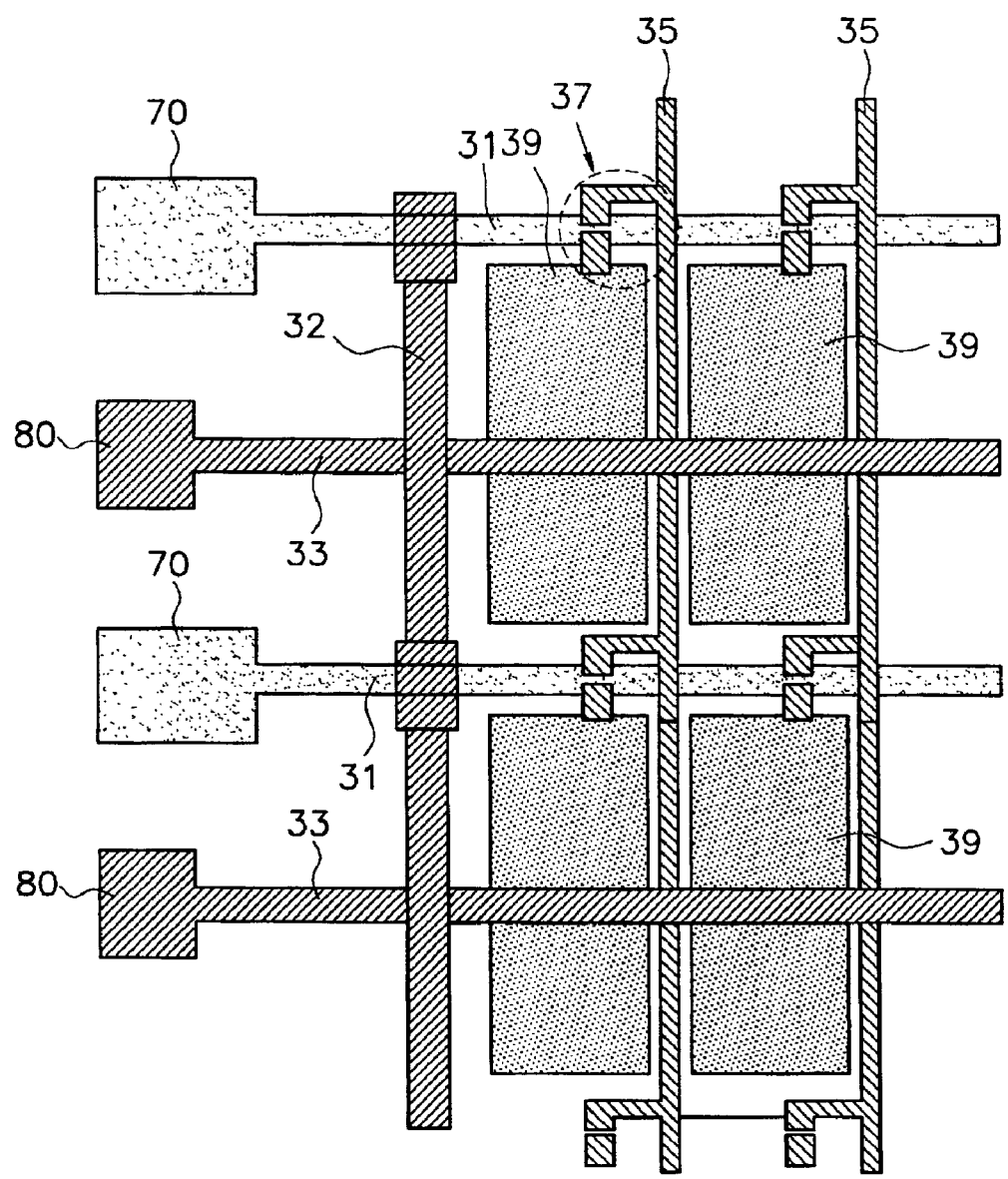
FIG. 4 is a drawing showing a thin film transistor liquid crystal display having a linear shape common bus line according to the present invention.

FIG. 4 is a drawing showing a thin film transistor liquid crystal display having a linear shape common bus line according to the present invention.

Referring to FIG. 4, it has a structure similar to FIG. 3, except that a common bus line 33 is overlapped with the center of pixel electrode 39 and parallel with the gate bus line 31.

A shielding line 32 is arranged to be electrically in contact with each common bus line 33 and parallel with the data bus line 35.

Therefore, it is possible to prevent diffusion of residual ions into the pixel from upper and lower parts of pixel regions adjacent to gate pad unit.

Figure 5:
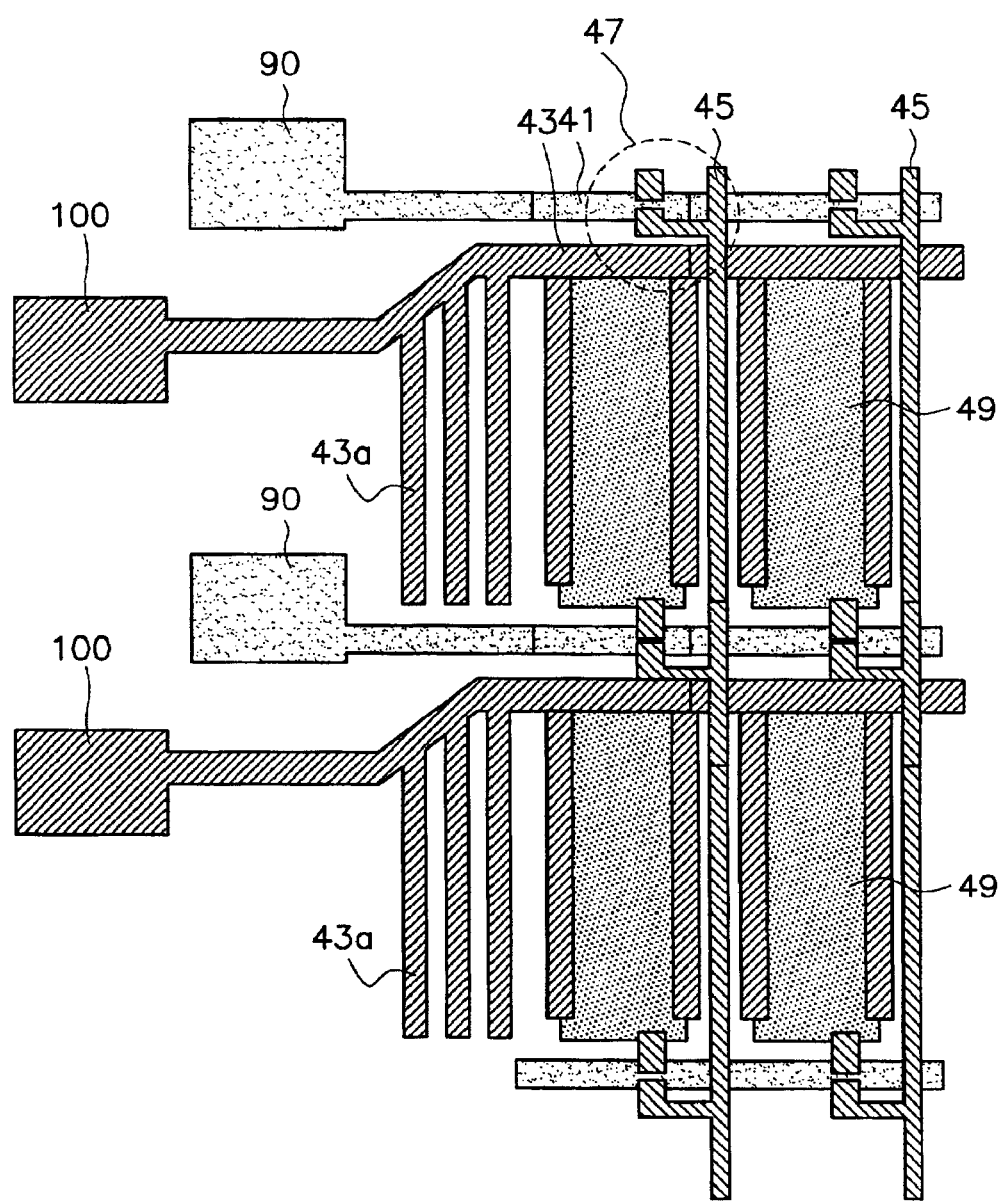
FIGS. 5 and 6 are drawing showing other embodiments of the present invention.
Figure 6:
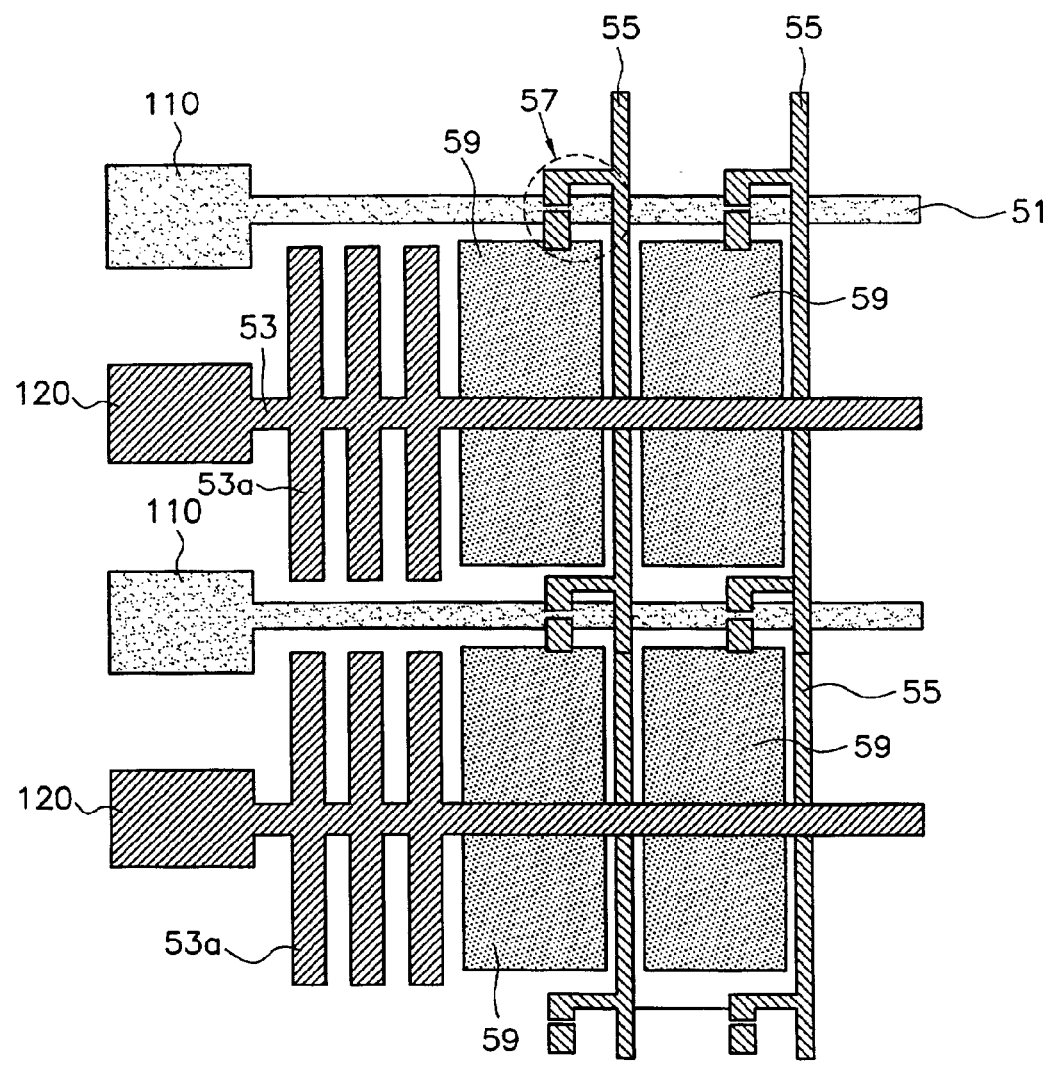

FIGS. 5 and 6 are drawings showing other embodiments of the present invention. According to theses embodiments, the shielding line is not arranged but a plurality of shielding branches 43a, 53a are arranged on pixel regions to the direction parallel with the data bus lines 45, 55. The shielding branches 43a, 53a are arranged at least 2, desirably 3 and formed at the same time with formation of the pi ($\pi$) shape or linear shape common bus line.

According to the present invention, it is possible to prevent adsorption and diffusion of residual ions into pixel regions when driving signals are applied by arranging a shielding line in contact with common bus line or a plurality of shielding branches formed by patterning at the same time with the common bus line in each pixel regions adjacent to pad unit to apply the same voltage with the common bus line to the shielding line or shielding branches.

As described above, the present invention can prevent generation of bright lines due to adsorption of residual ions in adjacent pixel regions by arranging a shielding line or shielding branches in contact with common bus line on the outer side of pixel adjacent to pad unit. Therefore, it is possible to realize high quality screen of thin film transistor liquid crystal display.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A thin film transistor liquid crystal display comprising:
   a substrate;
   a plurality of gate bus lines arranged to extend along a predetermined direction on the substrate, having a gate pad unit for applying driving signals disposed at one side of the unit pixel together with the gate pad unit;
   a plurality of data bus lines cross-arranged with the gate bus lines to define a unit pixel, having a data pad unit for applying graphic signals;
   a thin film transistor arranged at the intersection of the gate bus lines and the data bus lines;
   a pixel electrode arranged in the unit pixel region to be in contact with the thin film transistor; and
   a plurality of common bus lines arranged parallel with the gate bus lines, having a common pad unit for regularly applying common signals to pixels; and
   a shielding line arranged to be in contact with the common bus line and parallel with the data bus line and disposed on the periphery of the outer side of the unit pixel adjacent to the common pad unit and gate pad unit.

2. The thin film transistor liquid crystal display according to claim 1, wherein the common bus line has a pi($\pi$) structure that at least partially overlaps the upper part and both sides of the pixel electrode or a linear structure that overlaps the center part of the pixel electrode.

3. A thin film transistor liquid crystal display comprising:

a substrate;

a plurality of gate bus lines arranged to extend along a predetermined direction on the substrate, having a gate pad unit for applying driving signals;

a plurality of data bus lines cross-arranged with the gate bus lines to define a unit pixel, having a data pad unit for applying graphic signals disposed at one side of the unit pixel together with the gate pad unit;

a thin film transistor arranged at the intersection of the gate bus lines and the data bus lines;

a pixel electrode arranged in the unit pixel region to be in contact with the thin film transistor;

a plurality of common bus lines arranged parallel with the gate bus lines, having a common pad unit for regularly applying common signals to pixels; and two or more shielding branches arranged in the pixel region of the unit pixel to be in contact with the common bus line and disposed on the periphery of the outer side of the unit pixel adjacent to the common pad unit and the gate pad unit.

4. The thin film transistor liquid crystal display according to claim 3, wherein the common bus line has a pi($\pi$) structure that at least partially overlaps the upper part and both sides of the pixel electrode or a linear structure that overlaps the center part of the pixel electrode.

5. The thin film transistor liquid crystal display according to claim 3, wherein three shielding branches are arranged in each pixel region.

6. The thin film transistor liquid crystal display according to claim 3, wherein the shielding branch is formed at the same time as the common bus line.

7. The thin film transistor liquid crystal display according to claim 1 wherein the shielding line is disposed between the common pad unit and the pixel region.

8. The thin film transistor liquid crystal display according to claim 1 wherein the shielding line is disposed between the gate pad unit and the pixel region.

* * * * *